United States Patent
Hayakawa et al.

(10) Patent No.: US 7,856,923 B2
(45) Date of Patent: Dec. 28, 2010

(54) FRYER

(75) Inventors: Tsuneyasu Hayakawa, Nagoya (JP); Hideki Kijimoto, Nagoya (JP)

(73) Assignee: Paloma Industries, Limited, Nagoya-Shi (JP)

( * ) Notice: Subject to any disclaimer, the term of this patent is extended or adjusted under 35 U.S.C. 154(b) by 134 days.

(21) Appl. No.: 12/027,291

(22) Filed: Feb. 7, 2008

(65) Prior Publication Data

US 2009/0007799 A1 Jan. 8, 2009

(30) Foreign Application Priority Data

Jul. 2, 2007 (JP) .............................. 2007-174372

(51) Int. Cl.
- A47J 37/12 (2006.01)
- A47J 27/08 (2006.01)
- H05B 3/02 (2006.01)

(52) U.S. Cl. .............................. 99/403; 99/337; 99/338; 219/507; 219/518

(58) Field of Classification Search .................. 99/407, 99/337, 338; 219/507, 518; A47J 37/12
See application file for complete search history.

(56) References Cited

U.S. PATENT DOCUMENTS

| | | | | |
|---|---|---|---|---|
| 2,250,729 A | * | 7/1941 | Smith | 220/252 |
| 2,351,210 A | * | 6/1944 | Hobbs | 118/423 |
| 2,614,718 A | * | 10/1952 | Loop | 220/252 |
| 3,495,525 A | * | 2/1970 | Piotrowski | 99/408 |
| 3,610,133 A | * | 10/1971 | Mies, Jr. | 99/337 |
| 3,641,925 A | * | 2/1972 | Glithro | 99/416 |
| 3,691,936 A | * | 9/1972 | Chiarelli | 99/337 |
| 4,422,441 A | * | 12/1983 | Schoepe | 126/299 C |
| 4,489,647 A | * | 12/1984 | Stamps et al. | 99/336 |
| 4,600,254 A | * | 7/1986 | Whalen | 312/323 |
| 4,840,287 A | * | 6/1989 | Brewer et al. | 220/316 |
| 5,129,386 A | * | 7/1992 | Meister | 126/299 R |
| 5,542,560 A | * | 8/1996 | Gerster et al. | 220/252 |
| 5,992,680 A | * | 11/1999 | Smith | 220/812 |
| 6,028,297 A | * | 2/2000 | Hamada et al. | 219/625 |
| 6,371,010 B1 | * | 4/2002 | Chikazawa et al. | 99/344 |
| 6,431,393 B1 | * | 8/2002 | Stewart | 220/826 |
| 6,443,051 B1 | * | 9/2002 | Suzuki | 99/330 |
| 6,619,191 B2 | * | 9/2003 | Mariotti | 99/407 |

(Continued)

FOREIGN PATENT DOCUMENTS

FR        2214446        8/1974

(Continued)

OTHER PUBLICATIONS

Pitco, Fat Vat, Aug. 2003, 1-2.*

*Primary Examiner*—Stephen J Ralis
(74) *Attorney, Agent, or Firm*—Burr & Brown

(57) ABSTRACT

A fryer is provided where an oil fire caused by overheating is accurately and rapidly extinguished and the oil can then be reused after extinguishing the fire. A housing includes a slide cover capable of sliding between a housing position and a shielding position, wherein the housing position is to open an upper face of an oil vat and the slide cover is housed on the side of the housing, and the shielding position is to close the upper face of the oil vat. When oil catches fire due to overheating, the fire can be extinguished by closing the upper face of the oil vat with the slide cover.

4 Claims, 2 Drawing Sheets

U.S. PATENT DOCUMENTS

| | | | | |
|---|---|---|---|---|
| 6,810,791 | B2 * | 11/2004 | Kijimoto | 99/330 |
| 7,100,497 | B2 * | 9/2006 | Shandross | 99/330 |
| 7,134,385 | B1 * | 11/2006 | Richard et al. | 99/403 |
| 2004/0177767 | A1 | 9/2004 | Kijimoto | |
| 2006/0185522 | A1 * | 8/2006 | Shandross | 99/330 |
| 2008/0149354 | A1 * | 6/2008 | Biehl | 169/65 |

FOREIGN PATENT DOCUMENTS

| | | |
|---|---|---|
| GB | 10119 | 1/1915 |
| GB | 1260297 | 1/1972 |
| JP | 05-309046 | 11/1993 |
| JP | 2002-085268 A1 | 3/2002 |
| JP | 2002-223953 A1 | 8/2002 |

* cited by examiner

FRYER

This application claims the benefit of Japanese Patent Application Number 2007-174372 on Jul. 2, 2007, the entirety of which is incorporated by reference.

FIELD OF THE INVENTION

The present invention relates to a fryer for cooking foods put in a oil vat which is filled with oil and heated by a heating means such as a pulse burner.

BACKGROUND OF THE INVENTION

A conventional fryer includes an oil vat for containing cooking oil at an upper part of a housing and heating means such as a pulse burner for heating the oil in the oil vat as described in patent documents 1 and 2. In the oil vat, the oil is heated to a predetermined temperature by heating means and then the food is put into the oil.

[Patent Document 1] Japanese Unexamined Patent Publication No. 2002-223953

[Patent Document 2] Japanese Unexamined Patent Publication No. 2002-85268

SUMMARY OF THE INVENTION

Conventional fryers usually include a fire extinguisher which automatically sprays extinguishing composition so as to extinguish a fire when oil catches fire because of overheating and the like. However, when the extinguishing composition is used, the oil and foods must be discarded because the composition is mixed in the oil and also an electric system such as a controller may be damaged and become unusable. Further, as the extinguishing composition is sprayed to areas around the fryer, these areas may also be damaged.

The present invention provides a fryer, which can rapidly and accurately extinguish an oil fire caused by overheating.

Further, another object of the present invention is to provide a fryer where after extinguishing a fire, the oil can be reused, and the extinguishing does not affect the areas around the fryer.

In order to achieve the above-described objects, a first aspect of the present invention is a fryer where a housing includes a shielding member capable of arbitrarily opening/closing an upper face of an oil vat.

In addition to the first aspect of the present invention, a second aspect of the present invention is a fryer in which the shielding member is configured as a slide cover capable of sliding between an arbitrary housing position where the shielding member is housed to open the upper face of the oil vat and a shielding position to close the upper face of the oil vat, which saves space.

According to the first aspect of the present invention, an oil fire can rapidly and accurately be extinguished with a shielding member when the oil catches fire. Additionally, since an extinguishing composition is not used, the oil can be reused after appropriate corrections are made to eliminate the cause of the fire. Furthermore, the electric control system of the fryer and areas surrounding the fryer are not affected.

According to the second aspect of the invention, in addition to the first aspect, a shielding member is configured as a sliding cover, and thus the necessary space for the fryer is reduced.

DETAILED DESCRIPTION OF THE INVENTION

Figure 1:
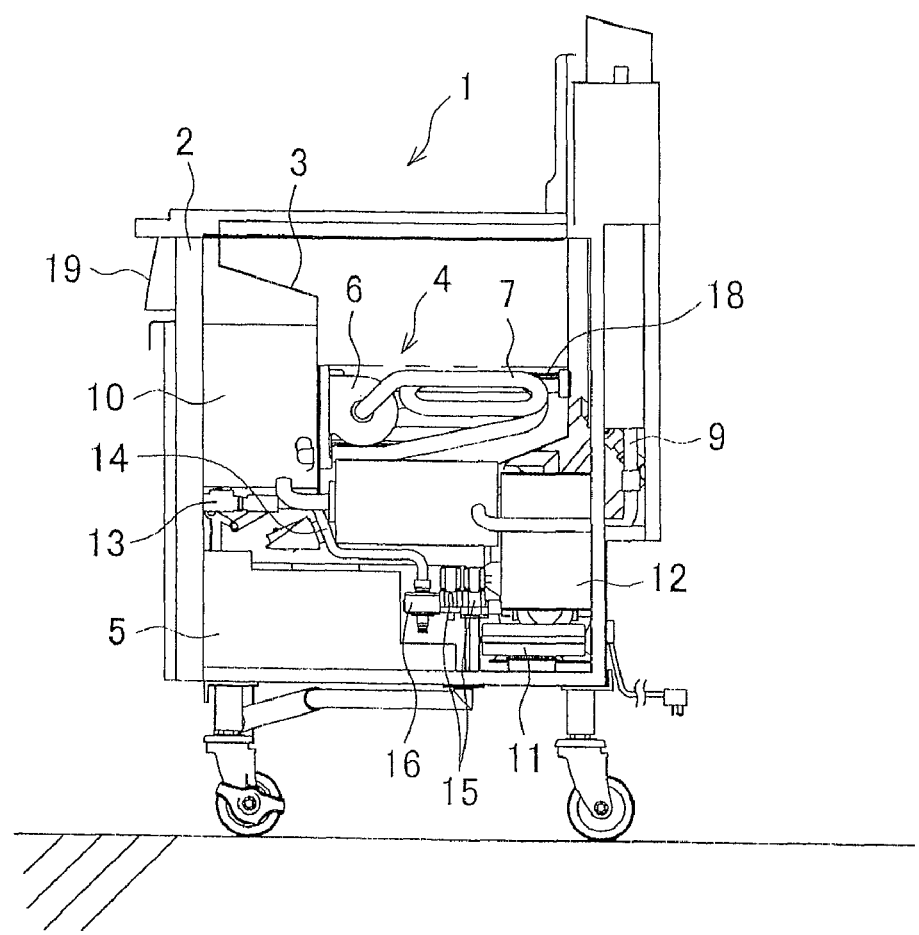
FIG. 1 is a view from a right side face to illustrate a fryer.

An embodiment of the present invention will be described below referring to the drawings.

Figure 2A:
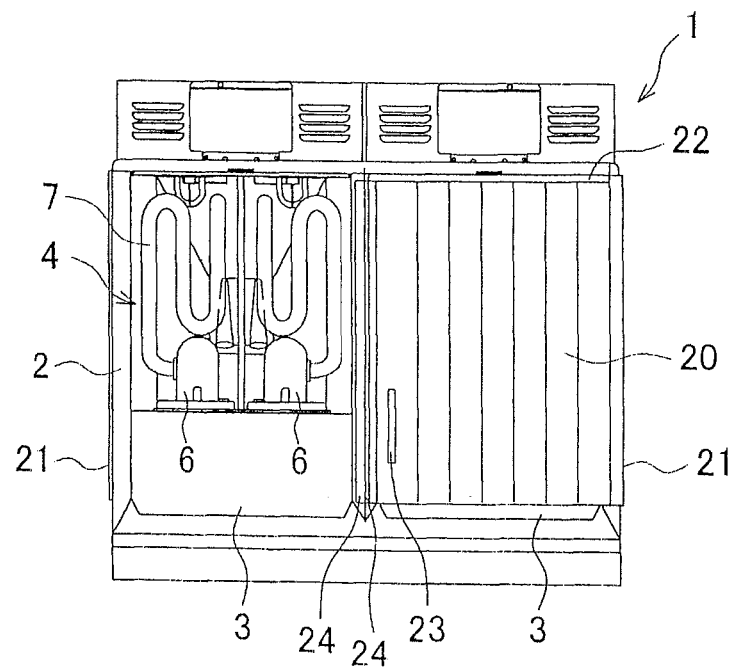
FIG. 2 (A) is a plane view of the fryer and FIG. 2 (B) is a front view of the fryer.
Figure 2B:
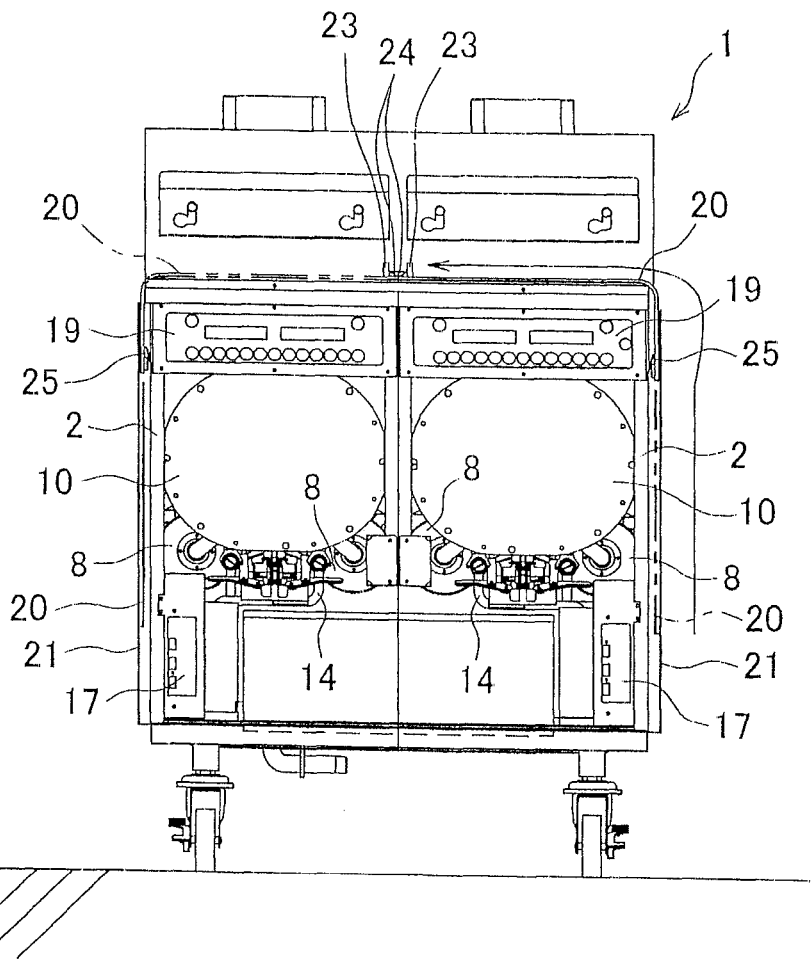

FIG. 1 is a view from the right side face to illustrate an example of a fryer, FIG. 2A is a plane view and FIG. 2B is a front view. A fryer 1 includes a pair of left and right housings 2 and 2. An oil vat 3 to be filled with oil, a pulse burner 4 as heating means for heating oil in each oil vat 3, and an oil cleaner 5 for filtering oil are provided in each housing 2. The pulse burner 4 has a combustion exhaust system including a combustion chamber 6 provided in the oil vat 3 to carry out a pulse combustion, a tail pipe 7 through which combusted exhaust gas from the combustion chamber 6 is passed, decouplers 8 and 8 connected with a downstream side of the tail pipe 7 and provided on both sides of the oil vat 3, and an exhaust pipe 9 connected with the downstream side of each decoupler 8 provided on a back side of the housing 2.

An air chamber 10 is provided at an external part of a front side of each oil vat 3. The air chamber 10 internally includes a mixing chamber which is not illustrated but continues to the combustion chamber 6. The air chamber 10 can supply combustion air from a blower 11, which is provided at a bottom face of the housing 2, through a muffler 12 and an air supply pipe 13. Further, electromagnetic valves 15 and 15, and a gas governor 16 are provided on a gas conduit pipe 14 connected with the mixing chamber in the air chamber 10. The electromagnetic valves 15 and 15 control opening/closing of a supply passage of fuel gas supplied toward the pulse burner 4, and the gas governor 16 to adjust gas pressure.

Further, a controller 17 is provided at lower part of a front side of each housing 2. The electromagnetic valves 15 and 15 and a temperature sensor 18 provided in the oil vat 3 are connected to the controller 17. The controller 17 can carry out ON/OFF-controlling based on a temperature detected signal from the temperature sensor 18 so that oil temperature in the oil vat 3 can be kept at a range of cooking temperature (e.g., 180° C. to 182° C.). The ON/OFF-controlling is carried out by opening/closing of the electromagnetic valves 15 and 15 and intermittently combusting mixed gas in the combustion chamber 6. An operation panel 19 is provided at an upper part of a front side of the housing 2 and is used to set a cooking mode and desired temperature which are sent to the controller 17 as instructions.

Each housing 2 includes a slide cover 20 as a shielding member. The slide covers 20 are symmetrical to the right and the left and thus will be described using only the right slide cover 20. The slide cover 20 has a flexible shutter shape made by continuously connecting a plurality of belt shaped plates in a width direction, and is housed in a housing part 21 provided on a side of the housing 2. As illustrated with an arrow in FIG. 2 B, the slide cover 20 can be manually pulled out from a housing position, which is a position indicated by a two-dot chain line in a left side of FIG. 2B, to a shielding position which is indicated by a solid line in the right side of FIG. 2 B along a reverse L-shaped guide rail 22 from the housing part 21 to the upper part of the oil vat 3. The housing position houses the slide cover 20 in a longitudinal direction toward the inside of the housing part 21, and the shielding position is close to a side upper part of the housing 2 and the oil vat 3. Reference numeral 23 shows a handle for a pulling out operation. The slide cover 20 is energized toward the housing position by a spring mechanism (not illustrated) provided in the housing part 21 in a normal state. Further, the slide cover 20 is locked with a lock member 24 provided at a partition part between the oil vats 3 and 3 provided at an upper part of the housing 2, and thus can be kept at the shielding position. An opening/closing detection switch 25 is provided in the housing part 21 and interfaces the end edge of the slide cover 20 at the shielding position thereof so as to leave the fryer ON, or turn the fryer OFF by determining the housing position of the slide cover.

In the fryer 1 with the above-described configuration, when the oil is filled in the oil vat 3 and cooking in a desired cooking mode is instructed through the operation panel 19, the slide cover 20 is placed in the housing position and the upper part of the oil vat 3 is opened, then the controller 17 combusts mixed gas in the combustion chamber 6 and operates the pulse burner 4. Then the oil is heated to the desired cooking temperature, and the cooking temperature is maintained by ON/OFF-controlling of the pulse burner 4. Thereafter, foods put into the oil vat 3 with a basket are cooked in the oil at high temperature. The combustion exhaust gas generated in the combustion chamber 6 is discharged from the tail pipe 7 toward the decoupler 8 and ejected from the exhaust pipe 9 toward a back side of the housing 2.

On the other hand, when the oil catches fire during cooking because of overheated oil caused by a reduction of the oil amount or no food in the oil, the slide cover 20 of the oil vat 3 on the fire side is placed in the shielding position and locked with the lock member 24 to close the upper part of the oil vat 3. At the same time, the pulse burner 4 is also stopped as an emergency measure by an operation of the operation panel 19. Since the flowing of air into the oil vat 3 is prevented, the fire will be automatically extinguished in a short time, usually in about 30 seconds to one minute. After extinguishing the fire, the slide cover 20 is then returned to the housing position and the upper part of the oil vat 3 is reopened.

According to the above-described fryer 1, since the housing 2 includes a slide cover 20 capable of arbitrarily opening/closing the upper face of the oil vat 3, the oil fire can rapidly and accurately be extinguished. Further, since an extinguishing composition is not used, the oil can be reused once the appropriate corrections or treatments are made to eliminate the cause of the fire, additionally the electric control system of the fryer or areas surrounding the fryer will also not be affected and available for use.

Further, since the slide cover 20 is used as the shielding member, necessary space is reduced.

In addition, the slide cover can be made of metal and also a fire-retardant synthetic resin or fabric. Further, the slide cover can be housed in a housing part in a longitudinal direction using a spring mechanism and also utilizing a publicly known rolling mechanism used as a roll. In this case, when a rolling mechanism is not provided at a lower part of the housing but provided at an upper end of the housing, the slide cover can be rapidly pulled out and housed in a short time.

Further, in the above-described embodiment, the pulling out operation is made in the left and right directions. However, the slide cover can be provided at the end edge on the back side of the oil vat together with a rolling mechanism so as to close the upper face of the oil vat by pulling out the slide cover toward the front side. In this case, an operation part, for example, a handle or an operation rod of the slide cover, is desirably provided close to a side face of the housing so as not to cross hands over the oil vat.

In addition, a non-contact sensor can be used to detect opening/closing of the slide cover.

In the above-described embodiment, shielding using the slide cover is carried out by a manual operation of the person cooking at the time of the fire. However, the shielding can also be automatically carried out in order to increase safety. For example, a rolling mechanism including a motor may be provided at either the front or rear end of the fryer providing both the taking in and out direction of the slide cover. When a temperature sensor detects that the oil catches fire, a motor is then driven to automatically slide the cover to the shielding position. Further, the motor can also be driven by button operation or the like on the operation panel so as to carry out the shielding.

Further, the shielding member is not limited to the slide cover. For example, a plate can be used as a cover where the plate is screwed to one end of edge of the housing with a hinge capable of opening and closing an opening of the upper part of the housing and, the shielding plate is normally in a hanging state along the side face of the housing, and when the oil catches fire, the shielding plate is rotated so as to close and cover the opening of the upper part of the housing. Thus, the shielding member may be suitably changed in many types without limiting to the above-described embodiments.

In addition, the heating means is not limited to a pulse burner. For example, a gas burner can be used. Further, a fryer not having a pair of oil vats but having just a single oil vat can be used in the present invention.

Further, the shielding member is not limited to use only during times of catching fire. While waiting for next food to be cooked, the shielding member can be used to cover the upper face of the oil vat and the amount of heat radiation from the oil can be suppressed, preventing the temperature from dropping. Thus, when the shielding member is used for heat retaining, it is not necessary to use the heating means as frequently, thereby improving energy savings.

What is claimed is:

1. A fryer comprising an oil vat filled with oil in an upper part of a housing, heating means for heating the oil in the oil vat, a flexible flat shuttered shielding member for arbitrarily opening/closing an upper face of the oil vat, said shielding member being formed by connecting a plurality of plates in a width direction, said shielding member being housed in a longitudinal direction of a housing position located on at least one side of the housing, whereby said shielding member is slidable and continuously movable in an inward overlapping direction over the face of the oil vat, and a detection switch that interfaces with said shielding member to turn the fryer off when the position of said shielding member closes the upper face of the oil vat.

2. The fryer according to claim 1, wherein said shielding member is capable of sliding between an arbitrary open housing position where said shielding member is housed to open the upper face of the oil vat and a closed shielding position to close the upper face of the oil vat.

3. The fryer according to claim 2, further comprising:
a lock member at a partition part for securing and holding said shielding member in place when said shielding member is placed in said closed shielding position.

4. The fryer according to claim 2, wherein once said shielding member is placed in said closed shielding position, air flow will be blocked from said oil vat to extinguish any existing oil fire contained in said oil vat.

* * * * *